Dec. 20, 1960 W. A. SCHAICH 2,964,795
METHOD OF FORMING HOLLOW PLASTIC ARTICLES FROM TUBING
Filed March 2, 1959 3 Sheets-Sheet 1
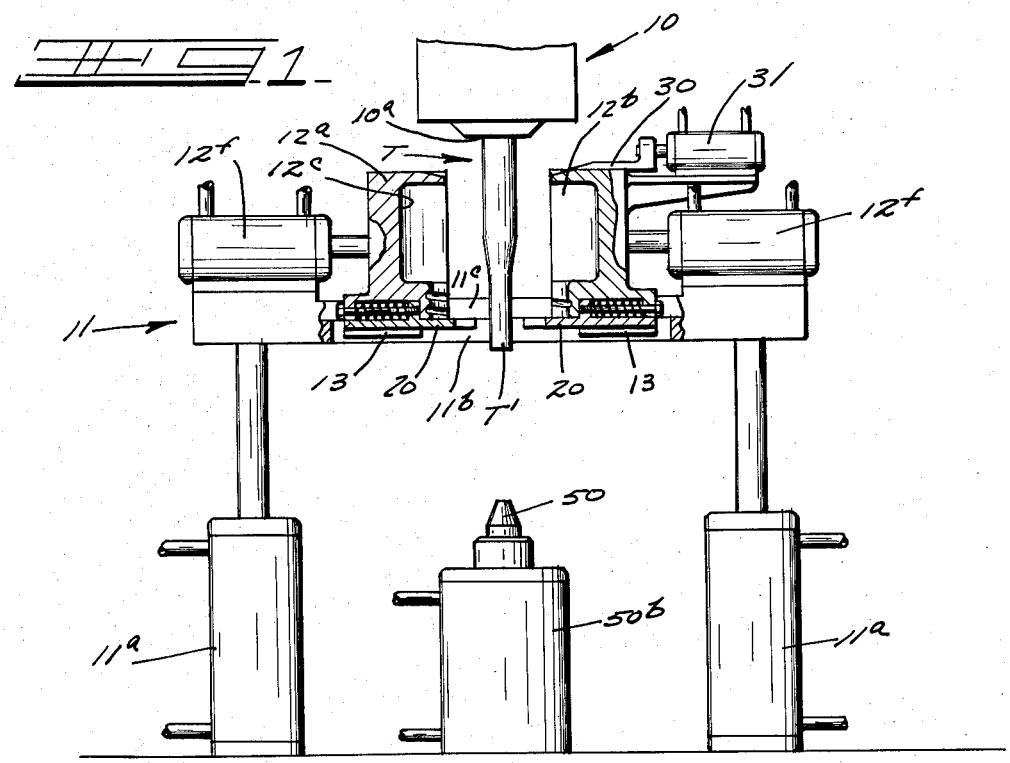
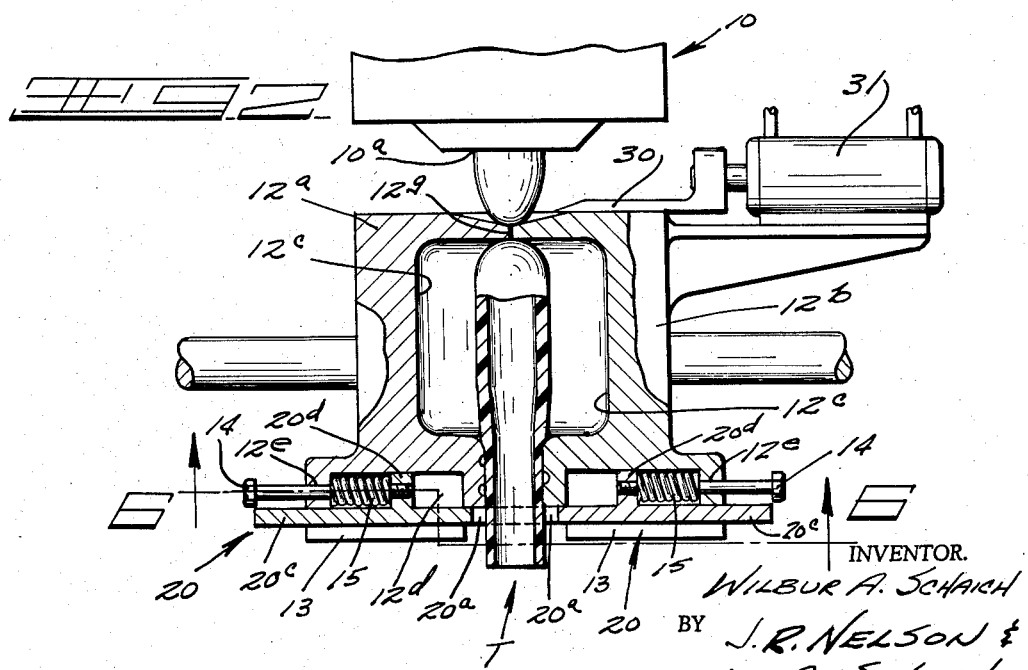
INVENTOR.
WILBUR A. SCHAICH
BY J. R. NELSON &
W. A. SCHAICH
ATTORNEYS Dec. 20, 1960   W. A. SCHAICH   2,964,795
METHOD OF FORMING HOLLOW PLASTIC ARTICLES FROM TUBING
Filed March 2, 1959   3 Sheets-Sheet 2
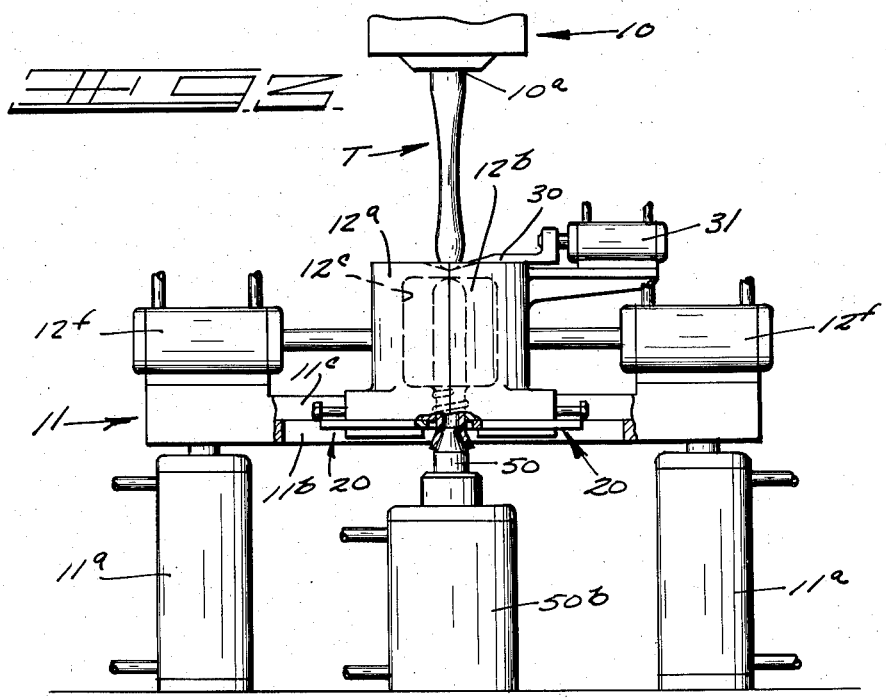
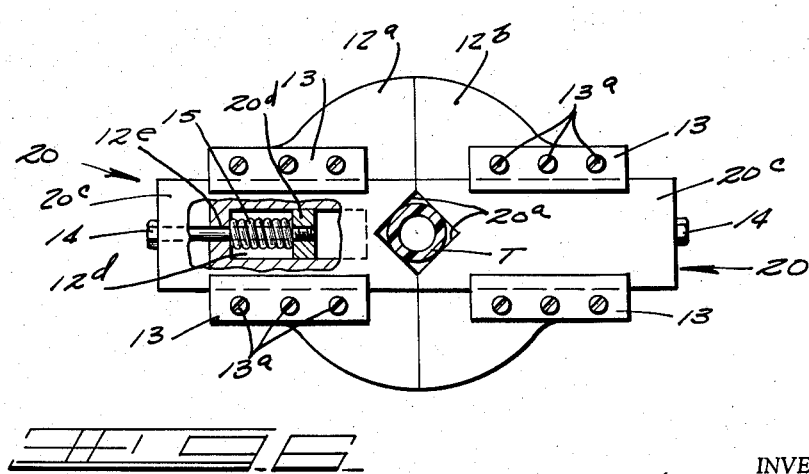
INVENTOR.
WILBUR A. SCHAICH
BY J. R. NELSON &
W. A. SCHAICH
ATTORNEYS

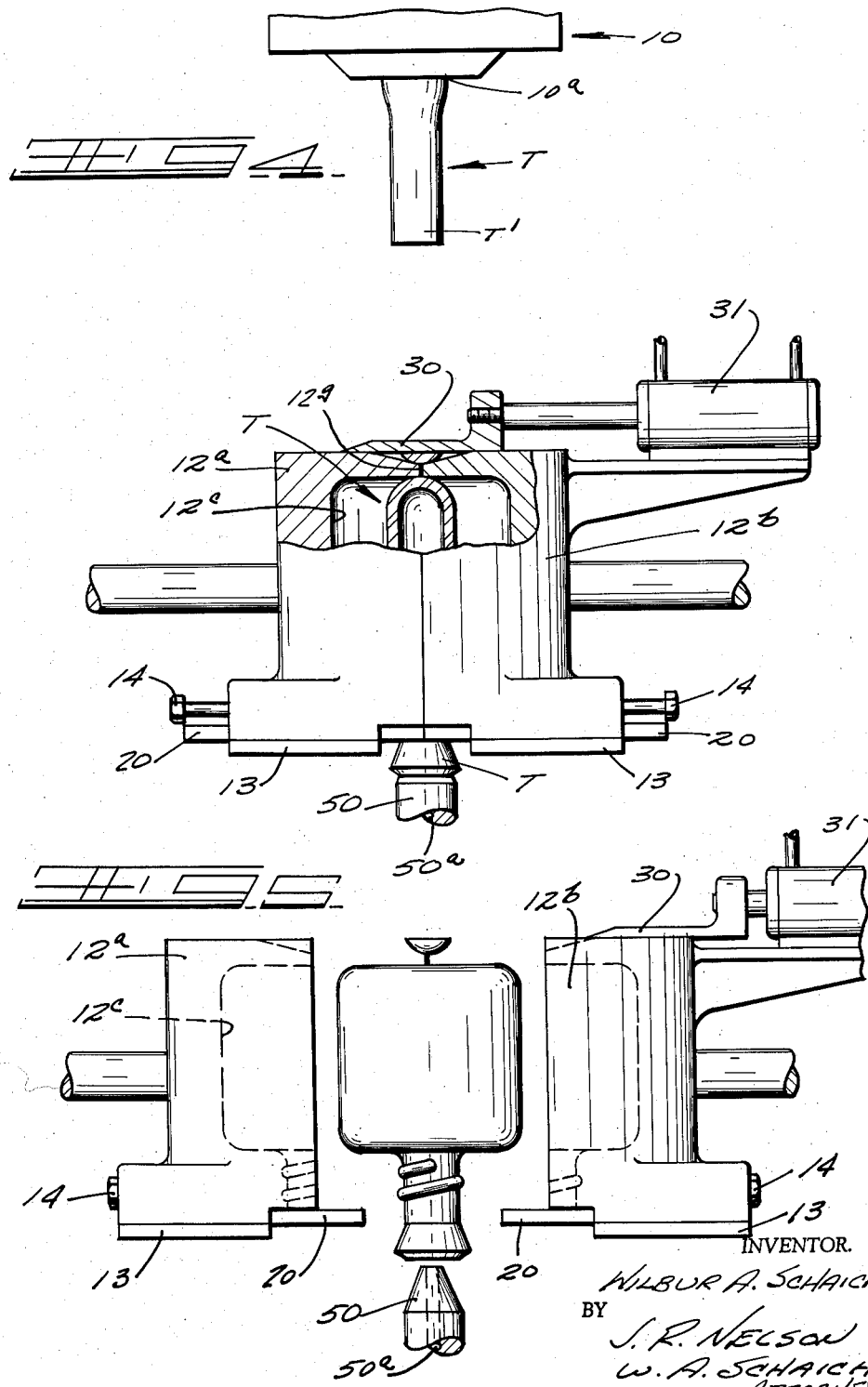

United States Patent Office 2,964,795
Patented Dec. 20, 1960

2,964,795

METHOD OF FORMING HOLLOW PLASTIC ARTICLES FROM TUBING

Wilbur A. Schaich, Maumee, Ohio, assignor to Owens-Illinois Glass Company, a corporation of Ohio Filed Mar. 2, 1959, Ser. No. 796,365

6 Claims. (Cl. 18—55)

This invention relates to an improved method and apparatus for forming hollow plastic articles from heated tubular lengths of thermoplastic materials, and more particularly, to the formation of hollow plastic articles such as containers having a reduced neck portion.

A variety of machines and processes have heretofore been proposed and utilized for forming hollow plastic articles such as bottles and similar containers having neck portions wherein a length of heated thermoplastic tubing is downwardly extruded from a horizontally disposed annular orifice. All of such prior processes and machines have suffered from one inherent disadvantage in the basic method. As the length of tubing is extruded, the weight of the tubing already extruded produces a differential stretching action on those portions of the tubing issuing from the orifice with the result that when the desired length of tubing is completely extruded, the top portions of the tubing will have a wall thickness which is substantially reduced over that of the lower portions of the tubing.

When such a differentially stressed length of tubing is enclosed in a partible mold to be expanded into the form of a container, it has been customary and convenient to arrange the cavity of the partible mold with the neck portion of the container disposed downwardly. The reason for doing this is that the blowing or expansion of the tubing within the partible mold may then be conveniently accomplished by a blow head which is brought into operative relationship with the bottom portions of the mold, thus avoiding interference with the next length of tubing being issued from the continuously operated extruder. As a result, the container that is formed has a substantially greater wall thickness in its neck portions which are formed from the lower portions of the extruded tubing, than in the bottom portions of the container, which are formed from the upper portions of the extruded tubing. This is a condition exactly reverse to that desired since the bottom portions of the container should preferably be substantially stronger and more rigid than the top portions. The condition is further aggravated in the case of containers having a bottle figuration in that the bottom portions of such container are of substantially greater diameter or width than the neck portions and hence the tubing from which such bottom portions of the container are produced must inherently be expanded to a much greater degree than those portions of the tubing from which the neck portion of the container is produced. The cumulative effect of these conditions necessarily requires that the neck portion of the resulting container be unnecessarily thick in order to provide adequate material in the bottom portions of such container. It is quite common to provide from 20% to 40% excess weight of material in a bottle shaped container in order to provide adequate wall thickness in the bottom portions of the container.

In the formation of other hollow plastic articles, such as toys, it is sometimes required that one end portion of the article, which was no greater in diameter, be substantially reduced in wall thickness over the remaining portions. With conventional forming processes and machines, such condition could not be realized.

Accordingly, it is an object of this invention to provide an improved method and apparatus for forming hollow plastic articles by expansion of lengths of heated thermoplastic tubing by which selective control of the wall thickness of an end portion of the desired article is achieved.

Still another object is to provide an improved method for blowing plastic containers having neck openings characterized by a substantially greater uniformity in wall thickness distribution of the neck portion of the container with respect to the bottom portions of the container than has heretofore been possible.

Another object of this invention is to provide a method for forming a hollow plastic article having a neck opening, such as a container, from a freely pendant vertically extruded length of heated thermoplastic tubing wherein that portion of the tubing which will subsequently define the neck portions of the container is stretched to substantially reduce the wall thickness thereof over the thickness of the remaining portions of the tubing which subsequently form the body of the container.

Still another object of this invention is to provide a continuous and automatic method and apparatus for producing hollow articles, such as containers, having reduced diameter neck openings, from a continuously extruded vertical tubular formation of heated thermoplastic material wherein the action of the successive partible molds engaging the thermoplastic tubing is caused to produce a differential stretching of that portion of each successive length of tubing produced which subsequently forms the neck portion of the desired article.

Other objects and advantages of this invention will become apparent to those skilled in the art from the following detailed description taken in conjunction with the annexed sheet of drawings on which is illustrated a preferred embodiment of this invention.

On the drawings:

Fig. 1 is a schematic elevational view of a plastic blowing machine incorporating basic apparatus required to carry out the method of this invention, the elements of the machine being shown at the starting position of the molding cycle.

Fig. 2 is a view similar to Fig. 1 but illustrating the next step of the method embodying this invention wherein the partible mold sections are closed about the vertically extruding tubing.

Fig. 3 is a view similar to Fig. 1 but illustrating the next step of the method of this invention wherein that portion of the extruded tubing which is not enclosed in the partible mold is subjected to an axial stretching action by movement of the closed partible mold.

Fig. 4 is a view similar to Fig. 1 but illustrating the next step of this invention wherein the mold enclosed length of the tubing is severed from the stretched length of tubing.

Fig. 5 is a view similar to Fig. 1 but illustrating the last step of the method of this invention wherein the partible mold sections are opened to release the formed article preliminary to initiating the next successive cycle of operations.

Fig. 6 is a sectional view on plane 6—6 of Fig. 2.

As shown on the drawings:

In its broadest aspects, this invention contemplates the differential stretching and hence differential reduction in wall thickness of an end portion of the length of heated thermoplastic tubing from which the desired article is to be formed, the stretched portion then being utilized to produce the neck or end portions of the desired article. When such differential stretching action is applied to the bottom portions of the length of vertically extruded tubing from which the desired article is to be formed, a substantial equalization of the differential wall thickness normally encountered between the bottom portions and upper portions of a vertically extruded length of heated thermoplastic tubing may be accomplished and thus a desired article can be produced with substantial equalization in wall thickness between those portions of the article formed from the lower portions of the vertically extruded tubing and those portions of the article formed from the upper portions of the vertically extruded length of thermoplastic tubing.

Such differential expansion of the bottom portions of the length of vertically extruded thermoplastic tubing from which the desired article is to be formed can be conveniently accomplished by imparting an axially downwardly stretching action to the lower portions of the vertically extruding tubing after only an initial length of such tubing is issued from the extruder orifice. By then interrupting the axial stretching action and continuing the extrusion to produce the desired final length of tubing, the final length of tubing will have its lower portions formed with substantially reduced wall thickness and diameter with respect to that which is normally produced by continuous vertical extrusion.

In fact, such differential reduction in wall thickness and diameter of the lower portions of the vertically extruded tubing can be carried beyond the point of merely compensating for the normal differential inherently produced by the weight of the extruded tubing so as to result in a length of tubing from which the desired article is formed wherein the lower portions of the tubing are actually substantially reduced in wall thickness relative to the upper portions of the tubing. Upon enclosing such a length of tubing in a partible container mold and arranging the cavity of such partible mold so that the neck portion of the desired container encloses the reduced wall thickness end portion of the tubing, the resulting article produced by expansion of such length of tubing in the partible mold can have substantially the same or less wall thickness in the neck portion as in the body portion of the resulting article.

While not limited thereto, the method of this invention can be conveniently carried out on a well-known type of plastic blowing machine which is already available on the market by a minor modification of the operating cycle and a relocation of the tube severing knife or shears. With such a machine, the differential axial stretching action described above may be accomplished on each successive length of tubing by the movement of the partible mold during the production of the previous article. Of course, it is equally possible to produce such differential stretching of the lower portions of the extruded length of tubing by a manual operation or by auxiliary apparatus entirely independent of the partible molds.

Referring now to the drawings, there is schematically illustrated a complete machine of a type which is well known and currently offered on the market which has been modified to operate in accordance with the method of this invention. Such machine is more particularly described and illustrated in my copending application, Serial No. 768,526 filed October 16, 1958 and assigned to the assignee of this invention.

Referring to Fig. 1, an extruder 10 is provided which is capable of continuously issuing a freely pendant vertical tube T of heated thermoplastic material. It will be noted that the tube T shown in Fig. 1 is illustrated as having a reduced diameter, reduced wall thickness lower section T' but it is to be understood that this reduced diameter section results from the preceding cycle of operation of the machine in accordance with the method of this invention. The tube T, as issued by the extruder 10, has a uniform wall thickness and diameter at the point of issuance. However, as a length of tube is extruded, sufficient to form the desired article, the weight of the extruded tube produces differential axial stress in the top portions of the extruded tube so that the wall thickness of the top portions of the extruded tube would ordinarily be substantially less than that of the lower portions of such tube.

A mold bed 11 is provided which is capable of vertical movement relative to the extruder orifice 10a. Preferably, mold bed 11 comprises a horizontal plate-like element which is supported by a pair of vertically disposed fluid pressure cylinders 11a which effect upward and downward movements of the mold bed 11 as required to comply with the method of this invention. In the central portion of the mold bed 11, an elongated slot 11b is provided which is of substantially greater width than the extruded thermoplastic tube T, so as to permit the free end of such tubular formation to freely pass through such slot, even though such tube may curl substantially out of axial alignment with the extrusion axis.

A pair of partible mold sections 12a and 12b are provided which, when closed, define a molding cavity 12c corresponding to the configuration of the plastic article desired. Mold cavity 12c is illustrated as constituting a bottle shaped configuration with the neck portion of the bottle being disposed downwardly. Mold sections 12a and 12b are respectively laterally shiftable with respect to the mold bed 11 and may, if desired, be directly mounted on mold bed 11 for horizontal sliding movements with respect thereto. For example, each mold section 12a and 12b may slide between a pair of upstanding guide members 11c formed on the top surface of mold bed 11, while the bottom portions of each mold section project into the central elongated slot 11b. A pair of fluid actuated cylinders 12f are respectively provided on opposite ends of mold bed 11 for operating mold sections 12a and 12b and thereby produce the desired lateral shifting movements of such mold sections relative to the mold bed 11.

The bottom faces of the mold sections 12a and 12b are respectively utilized to mount a pair of tube guiding members 20. Such guiding members are preferably constructed and mounted in the same manner as disclosed and claimed in the copending application of Elmer L. Adams and Richard C. Gasmire, Serial No. 790,099, filed January 30, 1959, and assigned to the assignee of this invention. Thus, the bottom faces of mold sections 12a and 12b are respectively provided with elongated recesses 12d. Each guiding member 20 has a rectangular stem portion 20c (Fig. 6) slidably received in the corresponding mold recess 12d and is retained in such recess by cover plates 13 which are secured to the corresponding mold section by bolts 13a. An upwardly projecting lug 20d is formed on each holding member 20 which receives the threaded end of a spring guide bolt 14 which passes into the mold recess 12d through a suitable aperture 12e in the end wall thereof. A spring 15 is mounted on the guide bolt 14 and functions to bias the corresponding tube guiding member 20 to a forwardly projecting position relative to its corresponding mold section.

The pair of tube guiding members 20 each define a tube engaging notch 20a in their opposed vertical surfaces, which notches, when the tube guiding members are in abutment, cooperate to engage the lower portions of the extruded tube T. Since the notches 20a are of generally tapered configuration, a lateral guiding action is imparted to the end of tubing T to direct such end of the tubing to a central position with respect to the mold section.

Additionally, a tube severing knife 30 is provided together with a cylinder 31 for actuating such knife. While not essential, the knife 30 and cylinder 31 may be conveniently mounted on the top surface of one of the mold sections, for example, the mold section 12b.

A blow head 50 having a tapered head is provided to cooperate with the bottom open end of the tubing T, and the vertical position of blow head 50 is controlled by a fluid cylinder 50b.

Starting with the elements of the machine positioned as in Fig. 1, wherein a full length of tubing T has already been extruded and the bottom portions T' thereof reduced in diameter by the preceding cycle of operations of the machine, the operation of the machine proceeds as follows:

The mold bed 11 is in its uppermost position with respect to the extruder orifice 10a and the mold sections 12a and 12b are moved toward each other so as to bring the pair of tube guide members 20 into abutting relationship and hence, into operative engagement with the bottom end of the thermoplastic tubing T. The tubing T is thus shifted to a central concentric position with respect to the cavity 12c defined by the mold sections 12a and 12b and the closing movement of such mold sections may then be completed as illustrated in Fig. 2. Upon closing the mold sections 12a and 12b, the upper portion of the tubing T is pinched and sealed by the top mold walls 12g. Thus, the extruded length of tubing T is firmly grasped by the closed mold sections.

The mold bed 11, and hence, the closed mold sections 12a and 12b are then moved downwardly at a rate substantially exceeding the rate of extrusion of the tubing T so as to impart a desired degree of axial stretch to those portions of the tubing T lying between the top surfaces of the mold sections and the extruded orifice 10a. The amount of such axial stretching imparted to the tubing T is, of course, a function of the speed of downward movement of the closed mold sections relative to the rate of extrusion, and the vertical distance that such mold sections are moved before severing of the tubing is accomplished. By adjustment of these factors, it is apparent that almost any desired degree of axial stretching of that portion of the tubing T can be produced.

When the desired amount of axial stretching of the tubing T is accomplished, the knife cylinder 31 is actuated to traverse the cutting knife 30 through the tubing T at a point remote from the extruder orifice 10a. As illustrated in Fig. 3, this cutting operation may conveniently be performed when the mold bed 11 reaches its lowermost position relative to the extruder orifice 10a. However, it should be distinctly understood that the timing of the tube severing operation and indeed the location of the tube severing operation may be widely varied to produce almost any desired degree of axial stretch in the tubing T and over any desired predetermined length of such tubing T. By proper design and location of knife 30, such severing could be accomplished closely adjacent the pinched portions of tubing T, hence function as a tail removal step for the finished article. Severing should, of course, be accomplished in such manner as to leave the severed end of the tubing open. Immediately upon completion of the severing step, the axially stretched length of tubing T will spring upwardly due to its own elastic memory, as illustrated in Fig. 4, and thus suitable vertical space is provided between the lower end of the tubing T and the top surfaces of the mold sections to avoid interference therebetween even though the extrusion operation is continuous. Thus a reduced diameter (and hence wall thickness) bottom end portion T' is formed on the oncoming length of extruded tubing to produce the tubing configuration already illustrated in Fig. 1.

The severed length of tubing contained within the mold sections 12a and 12b is then expanded to conform to the molding cavity 12c in conventional fashion. For example, the blow head 50 is moved upwardly and the tapered head 50a inserted into the open bottom end of the severed length of tubing either prior to the closing of the mold sections or subsequent thereto. In either event, pressured air or other suitable blowing fluid is applied to the interior of the severed length of tubing through the hollow core 50a of the blow head 50 and the severed length of tubing is thereby expanded to conform to the mold cavity 12c as illustrated in Fig. 5.

After cooling and setting of the expanded thermoplastic material, the mold sections 12a and 12b are moved laterally apart to the position shown in Fig. 5 to concurrently release the formed article from the mold cavity, and from the pair of tube guiding members 20. The blow head 50 is concurrently retracted so that the formed article may be entirely removed from the machine. The mold bed 11 is then raised by its cylinders 11a to the starting position illustrated in Fig. 1 wherein the mold sections are spaced around the next length of tubing T which has been extruded during the aforedescribed blowing and cooling operations and which has a bottom portion T' of reduced diameter and wall thickness formed by the preceding tube stretching operations.

From the foregoing description, it is apparent that any article having a reduced diameter or wall thickness end portion may be conveniently formed by producing an axially stretched tubing portion T' corresponding in length to such end portion of the desired article and closing the mold sections about the length of tubing so that the axially stretched portions T' are enclosed by the reduced diameter end portions of the molding cavity. Thus, in the specific example of forming a bottle having a reduced diameter neck portion, the axially stretched, and hence reduced diameter and wall thickness tubing portion T' is enclosed within those portions of the molding cavity 12c which define the neck portion of the bottle. Since these portions of the bottle are subjected to less expansion during the blowing of the bottle than the remaining portions, it is apparent that the methods of this invention will permit the production of a bottle having substantially uniform wall thickness from the neck portion throughout the body of the bottle.

It is therefore apparent that the methods of this invention permit the inherent differential stretching of a vertically extruded thermoplastic tubing to be more than overcome and compensated for, in that the lower portions of the vertically extruded tubing, which inherently tend to be of greater thickness than the upper portions of such tubing, are axially stretched to reduce the wall thickness to any desired degree and such stretching action may be accomplished over any desired length of such lower portions of the tubing. Hence, this invention provides unusual advantages in the blow molding of articles having end portions of substantially different dimensions, either in wall thickness, diameter or circumference than the remaining portions of the article, and thus greatly increases the utility and flexibility of plastic blowing machines operating upon vertically extruded lengths of thermoplastic tubing.

It will, of course, be understood that various details of construction may be modified through a wide range without departing from the principles of this invention, and it is, therefore, not the purpose to limit the patent granted hereon otherwise than necessitated by the scope of the appended claims.

I claim:

1. The method of forming a plastic container having a neck portion by expansion of a heated vertically extruded length of thermoplastic tubing in a partible mold, comprising the steps of extruding an initial length of tubing substantially less than the length required to produce the desired container, grasping the bottom portion of said initial length of tubing and axially downwardly stretching same to produce a substantial decrease in the wall thickness of said initial length, releasing the bottom portion of the tubing, continuing the extrusion of the tubing to produce the desired final length thereof, and enclosing and expanding the final length of tubing in a partible mold disposed with the neck portion of the mold cavity enclosing the reduced thickness lower portions of said tubing.

2. The method of forming a hollow plastic article having a reduced end portion by expansion of a heated length of thermoplastic tubing in a partible mold comprising cyclically repeating the steps of: (1) continuously downwardly extruding heated thermoplastic material in the form of a freely pendant vertical tube, (2) enclosing a lower portion of the extruded tubing in a partible mold with the reduced end portion of the cavity enclosing the lower portion of the tubing, (3) moving the closed partible mold axially downwardly at a rate exceeding that of the extrusion to substantially axially stretch the unenclosed upper portion of the extruded tubing, (4) severing said stretched upper portion of the tubing above said partible mold, (5) expanding and cooling the enclosed length of tubing in said partible mold to form the desired article, and (6) opening the partible mold to release the formed article.

3. The method of claim 2 wherein the same partible mold is utilized to form each successive article.

4. The method of forming a hollow plastic article having an end portion of different dimensions than the remainder of the article by expansion of a heated vertically downwardly extruded length of thermoplastic tubing in a partible mold, comprising the steps of extruding an initial length of tubing substantially less than the length required to produce the desired article, grasping the bottom portion of said initial length of tubing and axially downwardly stretching same to produce a substantial decrease in the wall thickness of said initial length, releasing the bottom portion of the tubing, continuing the extrusion of the tubing to produce the desired final length thereof, and enclosing and expanding the final length of tubing in a partible mold disposed with the portion of the mold cavity corresponding to said end portion of the article enclosing the reduced thickness lower portions of said tubing.

5. The method of claim 4 wherein the grasping and stretching of the initial length of tubing is performed by movements of the partible mold which produced the preceding article, and wherein the releasing of the initial length of tubing is performed by severing the tubing above said partible mold.

6. The method of forming a plastic container having a reduced neck portion by expansion of a heated vertically extruded length of tubing in a partible mold comprising continuously downwardly extruding heated thermoplastic material in the form of a freely pendant vertical tube and on this continuously extruding tube cyclically repeating the steps of: (1) enclosing a portion of extruded tubing in a partible mold with the reduced end portion of the mold cavity enclosing the lower portion of the tube; (2) moving the closed partible mold axially downward at a rate exceeding the rate of extrusion to substantially axially stretch the unenclosed portion of the extruding tube; (3) severing the unenclosed tube above said partible mold thereby leaving a freely pendant tube having a lower portion of reduced cross-sectional area; (4) expanding and cooling the enclosed length of tubing in said particle mold to form the desired article; and (5) opening the partible mold to release the formed article.

References Cited in the file of this patent

UNITED STATES PATENTS

| | | |
|---|---|---|
| 688,924 | Blair et al. | Dec. 17, 1901 |
| 2,790,994 | Cardot et al. | May 7, 1957 |

FOREIGN PATENTS

| | | |
|---|---|---|
| 1,029,586 | France | Mar. 11, 1953 |